US006715780B2

(12) United States Patent
Schaeffer et al.

(10) Patent No.: US 6,715,780 B2
(45) Date of Patent: Apr. 6, 2004

(54) WHEELCHAIR

(76) Inventors: Jon Eric Schaeffer, 11791 SW. Crater LP, Beaverton, OR (US) 97008; Jerome Edwin Schaeffer, 14965 NW. Northumbria, Beaverton, OR (US) 97006

( * ) Notice: Subject to any disclaimer, the term of this patent is extended or adjusted under 35 U.S.C. 154(b) by 47 days.

(21) Appl. No.: 09/977,424

(22) Filed: Oct. 15, 2001

(65) Prior Publication Data

US 2003/0071435 A1 Apr. 17, 2003

(51) Int. Cl.[7] .................................................. B62M 1/14
(52) U.S. Cl. .................................... 280/248; 280/250.1
(58) Field of Search ................................ 280/248, 247, 280/250.1, 246, 252, 242.1, 244

(56) References Cited

U.S. PATENT DOCUMENTS

| | | | | | |
|---|---|---|---|---|---|
| 838,228 | A | * | 12/1906 | Williams | |
| 4,705,284 | A | * | 11/1987 | Stout | 280/242 WC |
| 4,735,431 | A | * | 4/1988 | Tait | 280/242 WC |
| 4,858,494 | A | * | 8/1989 | Healy | 475/266 |
| 4,865,344 | A | * | 9/1989 | Romero, Sr. | 280/242 |
| 5,007,655 | A | * | 4/1991 | Hanna | 280/250.1 |
| 5,499,833 | A | * | 3/1996 | Her et al. | 280/247 |
| 5,865,455 | A | * | 2/1999 | Taylor | 280/250.1 |
| 6,450,518 | B1 | * | 9/2002 | Howard | 280/246 |

* cited by examiner

*Primary Examiner*—Avraham Lerner
(74) *Attorney, Agent, or Firm*—Dellett & Walters

(57) ABSTRACT

A manual wheelchair system comprising of a pair of lever arms positioned on each side of the chair that actuate a propulsion system located entirely under the seat of the wheelchair. Both the push and pull stroke of the levers, unlimited by stroke angle, provides unidirectional forward propulsion to the rear wheels of the chair. This is accomplished through drive gears fitted with one-way clutches and idler gears intermeshing with them. A sprocket is attached to one drive gear, and connects to an internal shifting hub using a chain or belt. This hub could optionally be a manual or automatic unit, with the automatic shifting unit relying on sensory feedback from the rear drive wheel to determine the most efficient ratio of operation. The hub connects to the rear drive axle through another sprocket and chain combination and drives the rear wheel as the levers are manipulated. The rear axle has a disconnecting clutch so that the entire drive propulsion system can disengaged from the chair. This allows the operator to use the wheelchair in a conventional manner (by hand directly at the wheel handrails).

21 Claims, 7 Drawing Sheets

WHEELCHAIR

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1) Field of Invention

This invention relates to a manually propelled wheelchair. In particular, this invention encompasses the chair as a system using two levers that the user stokes, in a rowing motion, forward and backward with. Both the "push" and "pull" stroke of these lever arms provide forward propulsion to the rear wheels. The two levers are mounted on each side of the chair while the remaining components (gears, shafts, bearings, clutches, internal shifting hubs, sprockets and chains) are located entirely under the seat of the chair. For reversing and indoor operation, the propulsion system can be disengaged. This allows the chair to be used in a conventional manner (by hand directly at the wheel handrails). An automatic shifting hub option is available that relies on sensory feedback from the rear wheels to intelligently determine which ratio of gears is best suited for terrain and speed.

2) Description of Prior Art

For persons having disabilities making walking impossible or difficult, chairs with wheels attached have traditionally been the standard means of transportation. These chairs typically have two small caster wheels on the front that can turn 360 degrees, and two larger wheels on the back for propulsion. The larger rear wheels have handrails attached to them that the user grasps and pushes forward repeatedly. This requires wrist and shoulder strength and often results in chronic stress injuries after extended use due to the poor ergonomics. In order to turn these wheelchairs, the operator grasps one wheel while pushing the other forward. Stopping is similarly done by grasping both rear wheels at the handrails. Thick leather gloves are often used in this grasp and release motion to aid in grip, and protect the user's hands from injury. In addition, climbing hills can be nearly impossible, as the user must remove his or her hands from the rim on each subsequent stroke. This creates an inefficient system and loss of work as the force from gravity pulls backward on the chair.

The following prior patents are discussed hereinbelow:

U.S. Pat. No. 287,789, Arbogast;

U.S. Pat. No. 3,666,292 Bartos;

U.S. Pat. No. 3,994,509 Schaeffer;

U.S. Pat. No. 4,506,900 Korosue;

U.S. Pat. No. 4,560,181 Heron;

U.S. Pat. No. 4,811,964 Horn et al.;

U.S. Pat. No. 5,007,655 Hanna;

U.S. Pat. No. 5,263,729 Watwood;

U.S. Pat. No. 5,632,499 Hutcherson et al.;

U.S. Pat. No. 5,865,455 Taylor;

U.S. Pat. No. 6.158,757 Tidcomb; and

U.S. Pat. No. 6,234,504 Taylor.

Employing handles to aid in the propulsion of wheelchairs dates back to before the turn of the century. For example, U.S. Pat. No. 287,789 granted to Arbogast on Nov. 6, 1883, utilizes a wheelchair hand crank system in which the ground wheels of a wheelchair are driven by a chain which is also connected to the hand crank. The chain provides a smooth linkage between the hand crank and the ground wheel. However, to attain the leverage needed for easy operation, the hand crank must be extended to an awkward length.

U.S. Pat. No. 3,666,292 utilizes two lever arms that turn a crank mechanism attached to the rear wheels of the wheelchair. Steering is accomplished by individually turning the lever arms, which translates this motion to the front caster wheels with cables. This chair provides no means of gearing for various speed or terrain conditions. Also, since the steering is done with the front wheels, the turning radius is extremely large and not practical for indoor operation.

U.S. Pat. No. 3,994,509 includes two lever arm drive assemblies mounted on the outside of the chair. Each propulsion drive system utilizes one way clutches with idler sprockets to transmit unidirectional rotation to the ground wheel in both the push and pull stroke. This system uses a cable chain capable of reverse bending to wrap around the idler sprockets. The entire propulsion system adds to the overall width of the wheelchair. The complex reverse bending chain also makes maintenance and assembly very difficult. In addition, the need for a reversible-shifting hub, not currently available on the market, makes the design proposition extremely expensive to manufacture.

U.S. Pat. No. 4,506,900 focuses on utilizing a single lever arm to propel the wheelchair with one hand (either the right or left side is possible). It provides a forward, reverse and neutral lever position to aid in maneuverability. It, however, offers no means of gearing, and can only be turned by placing the lever in a neutral position and manipulating the wheelchair by hand at the wheels.

U.S. Pat. No. 4,560,181 contains two lever arms that drive a ratchet wheel located on the rear wheel axle in both the forward and reverse stroke. The forward stroke engages one ratchet while the other is disengaged and reverses this action for the return stroke. By changing where the ratchet wheel is connected to the lever arm, a continuously variable gear ratio is possible. However, this adjustment can not be made while the chair is in motion, and it also will either increase or decrease the length of possible stroke available to the lever arm.

U.S. Pat. No. 4,811,964 uses a single lever arm located between the operator's legs. This drives two separate sprockets on one rear axle which employ ratcheting mechanisms with chains attached to cables. The cable is run through an idler pulley such that both the push and pull stroke transmits power to the rear wheels with no loss of work. Due to the single rear axle, conventional wheelchair turning (braking one wheel while powering the other) cannot be used. Instead, the lever arm acts as the turning mechanism through a pivoting universal joint. This increases the overall turning radius of the chair making it impractical for tight corners or indoor use. There are also no provisions for gearing or gaining mechanical advantage through other means to adjust the speed.

U.S. Pat. No. 5,007,655 uses a pair of lever arms on each side of the chair, each of which is connected to a sprocket on the rear drive wheels through a rack-and-pinion engagement. A one-way clutch is used to effectively drive the sprocket during the power stroke. After the power stroke is complete, the lever arm is retracted as the one-way clutch disengages from the rear drive wheel. This produces a wasted return stroke and loss of work for the user. The wheelchair has provisions for changing the leverage applied to the sprocket by moving where the lever arm attaches to the rack-and-pinion engagement. It does not, however, provide a means of easily changing this lever advantage while pumping the lever arms.

U.S. Pat. No. 5,263,729 uses a structure mounted to an existing wheelchair frame. A lever extends from the inside of the rear wheel axles up to the user. It contains a prawl that has teeth on it and extends over the tire of the wheel. These teeth provide positive contact with the tire during the pushing stroke and release during the return stroke. This invention has the disadvantage of a lost return stroke with no work generated, and also no means of gearing or gaining mechanical advantage are provided.

U.S. Pat. No. 5,632,499 is a wheelchair system using a pair of lever arms that drive self contained planetary gears. These gears are designed such that both the forward and reverse stroke drive the rear wheel in the forward direction. There are, however, no provisions made for dynamically gearing the system, and the complexities of the small, planetary gears make service and maintenance difficult.

U.S. Pat. No. 5,865,455 is a wheelchair using two push levers as its propulsion system. This chair employs standard bicycle sprocket clusters mounted on the rear axles with chains connecting to the front push lever drive system. A standard bicycle derailer is mounted on each axle to change gear ratios and thus speeds. This system uses a ratchet mechanism in the push levers to change between forward, neutral and reverse directions. It does not provide a means of using both the push and pull stroke to transmit unidirectional motion to the rear wheels. Therefore, one stroke, either the push or pull is a wasted return stroke and loss of work.

U.S. Pat. No. 6,158,757 uses a flexible motion conversion, such as a cable, to transmit the lever's pushing power directly to a drum attached to the rear wheel. This reduces complexity in gearing, chains and sprockets, but only transmits power during the pushing stroke. Again, the disadvantage to this system is a wasted return stroke with loss of work. Also, the only provisions made for changing mechanical advantage is by lengthening or shortening the lever arm. No changeable gears or hubs are used to adapt the chair to various speeds or terrain.

U.S. Pat. No. 6,234,504 B1 is a continuation of U.S. Pat. No. 5,865,455 described above. It employs the same principal, but has further descriptions and drawings of the invention.

BREIF SUMMARY OF THE INVENTION

We have invented a manual wheelchair that comprises a propulsion system located entirely under the seat of the chair. Two lever arms, positioned on the side of the chair, actuate the propulsion system and provide forward motion with both the push and pull stroke. This is accomplished using drive and idler gears fitted with one-way clutches or ratcheting mechanisms that transmit the power to the rear wheel through sprockets and chains.

The drive gears are linked to an internal shifting hub that is either manual or automatic in nature. The manual shifting option uses conventional bicycle shifting levers to change gears during operation. The automatic shifting hub option contains sensory feedback from the rear wheel, a shifting motor, and a central processing unit to automatically determine the most efficient gear available for terrain and speed.

A disconnecting clutch is located on the rear axle to disengage the entire propulsion system from the chair. This enables the user to reverse the chair, and also use it as a conventional wheelchair in very tight quarters (such as indoor operation). The disconnecting clutch employs two springs, one in compression and one in tension, to aid the user in disengaging the propulsion system under load.

Using quick release draw clamps, the entire chair is easily separated into three pieces comprising of; the seat, the right half propulsion system and the left half propulsion system. This makes transportation in vehicles practical. Also, the seat of the wheelchair can be moved forward or backward to accommodate getting into and out of the chair, as well as moving the effective center of gravity for stability and traction control.

DETAILED DESCRIPTION OF THE INVENTION

Reference will now be made to the preferred embodiment of the invention, an example of which is illustrated in the accompanying drawings. As required, detailed embodiments of the invention are disclosed herein; however, details to the function and structure are not meant to be interpreted as limiting, but rather a basis for the claims of the invention and educate one skilled in the art to employ the invention in virtually any structure.

Figure 1:
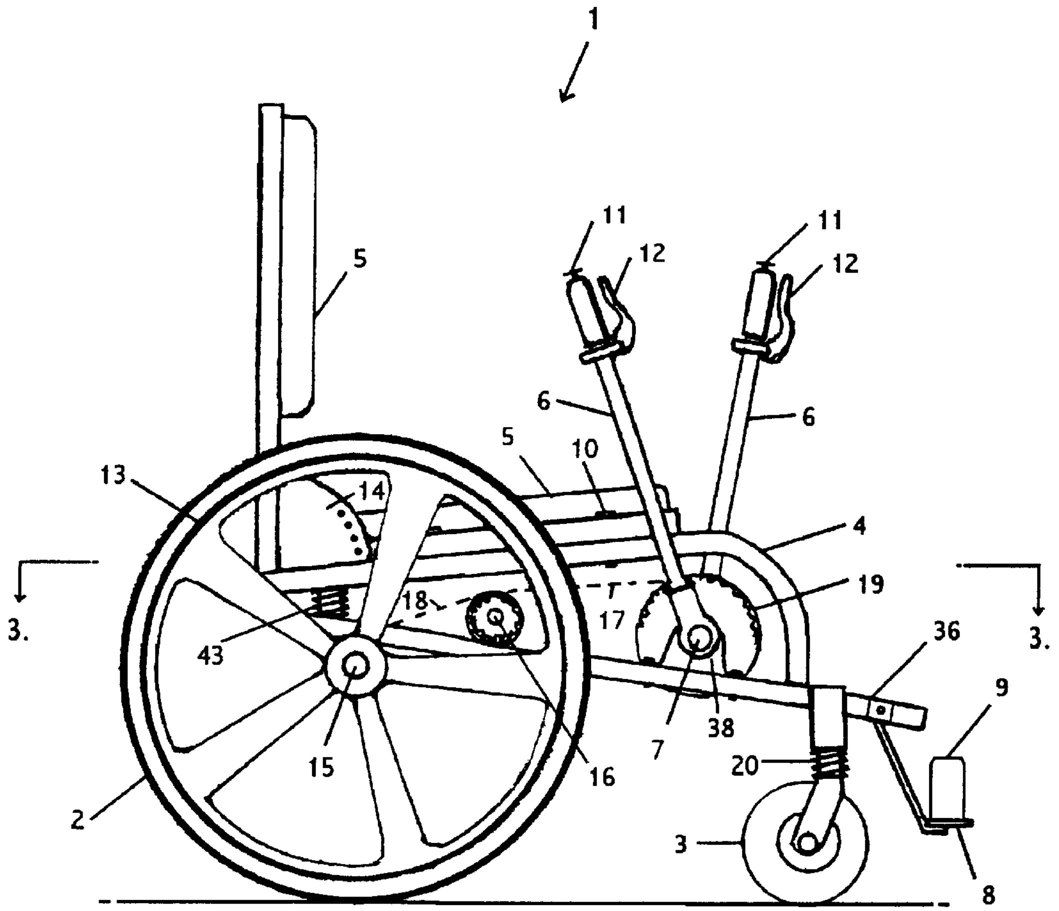
FIG. 1 is a right side elevation view of the wheelchair constructed in accordance with the present invention.

Referring now to FIG. 1, there is illustrated the wheelchair (1) with two large rear wheels (2) on the right and left side of the chair, and two smaller front casters (3) constructed in accordance with the present invention. Wheelchair (1) includes a frame (4) that may be formed of tubular metal, plastics, or any other sufficient materials able to support the chair. A seat (5) is connected to the tubular frame in order to provide a suitable position for the user to operate the wheelchair. This seat (5) can be moved forward or backward at the seats connection point (10) in relationship to the rear wheels (2) and front wheels (3), effectively changing the center of gravity of the wheelchair. This moveable seat (5) aids the user in traction control and also getting into and out of the chair. In addition, the seat angle is adjustable to various positions using an adjusting plate (14).

Two lever arms (6) are located on the outside of the chair which are pivotally connected to a shaft (7) near the front of the wheelchair. These lever arms (6) have attached brake levers (12) and disconnecting buttons (11) conveniently located for accessibility by the user during operation. A sprocket (19) connects the shaft (7) to an internal hub (16)

using a conventional bicycle chain or belt (17). This internal hub (16) may be either automatic or manual in nature, and offers several different gear ratios to accommodate various speeds and terrain. The internal hub connects to the rear axle (15) using a standard bicycle chain or belt (18). The combination of these components on the propulsion system allow the reciprocating motion of lever arms to be converted into unidirectional rotary motion at the rear wheel.

Independent suspension (20, 43) allow for a smoother ride and improved traction control as the wheels of the wheelchair can track rough terrain better than conventional fixed wheels. The footrests (8) can be swung up at position (36) to aid the user in getting into and out of the wheelchair. These footrests include straps (9) to keep the user's feet secure while operating the wheelchair.

Figure 2:
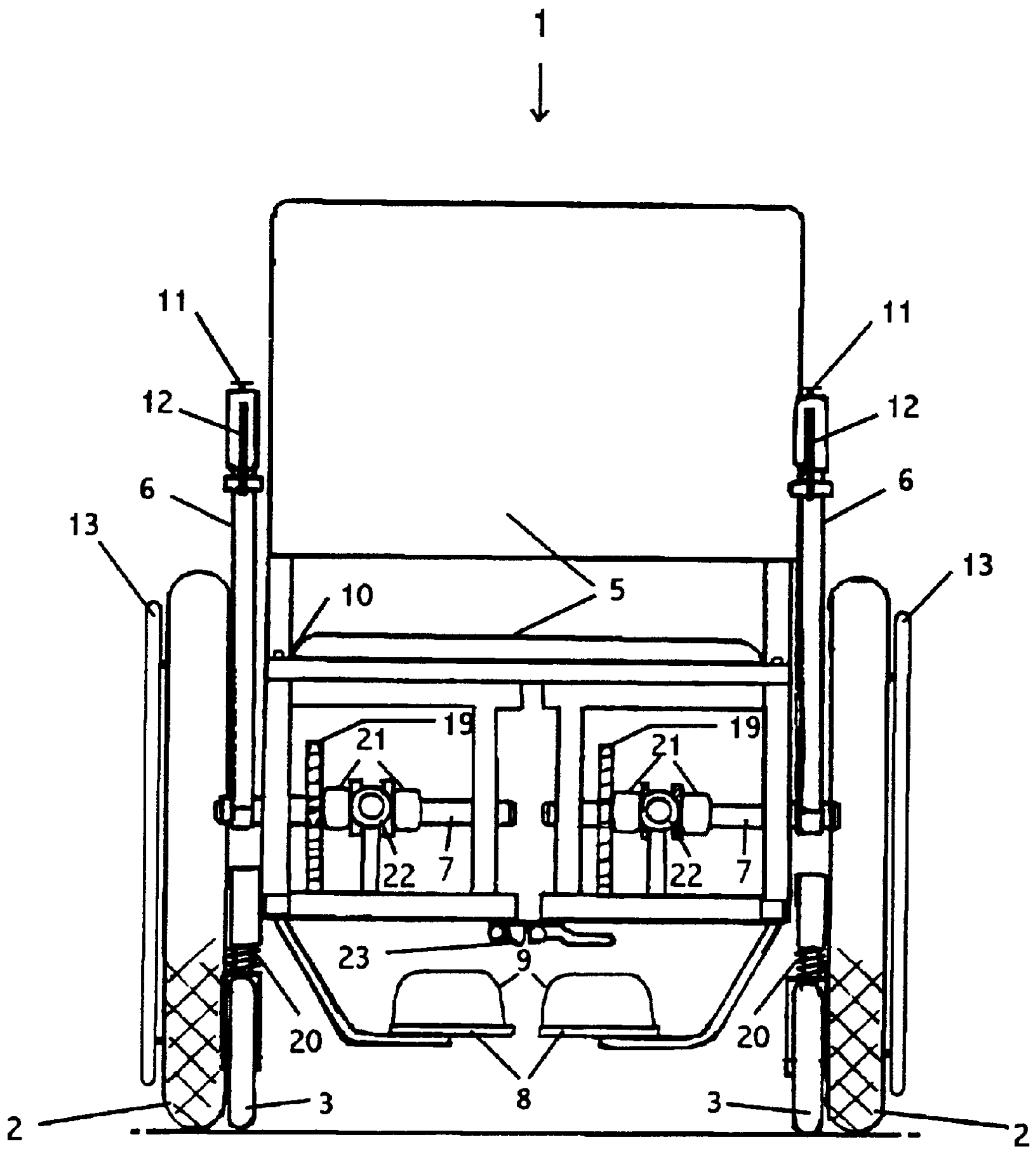
FIG. 2 is a front elevation view of the wheelchair.

Referring to FIG. 2, there is illustrated the wheelchair (1) in a front elevation view. Handrails (13) are shown and enable the user to operate the chair in a conventional manner while the disconnecting button (11) is pulled. The front portion of the propulsion system is clearly visible in this front elevation view. Two drive gears (21) fitted with one-way clutches allow both the forward and reverse stroke of levers (6) to provide forward propulsion to the rear wheels (2). The planetary idler gears (22) allow the transmission of unidirectional rotation to the sprocket (19) which transmits power to the rear wheel (2).

The seat of the chair (5) is removable at the upper chair frame (10) to assist in transportation. In addition, the two propulsion halves of the wheelchair separate near the centerline of the wheelchair using quick release clamps (23).

Figure 3:
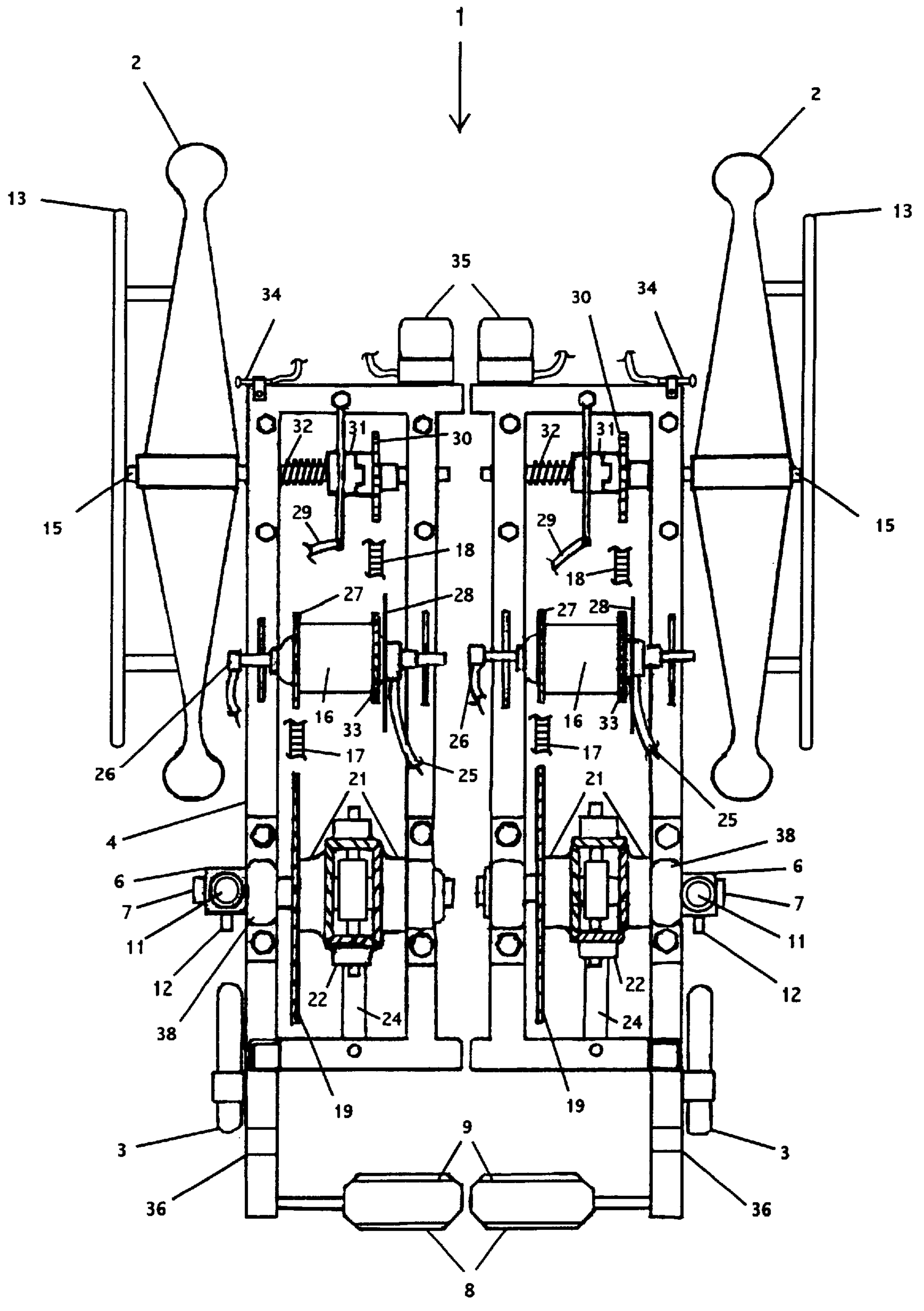
FIG. 3 is a cross sectional view of the wheelchair showing the propulsion system (gears, shafts, bearings, internal shifting hubs, rear drive axles).

Referring to FIG. 3, there is illustrated the wheelchair (1) in a top cross-sectional view. This view gives a clear representation of one way that the propulsion system components might be constructed. The lever arms (6) are pivotally connected to a shaft (7) that is supported with bearings (38) near the front of the wheelchair. This shaft (7) actuates two drive gears (21) fitted with one-way clutches or ratcheting mechanisms (see FIG. 5). Idler gears (22) transmit the reciprocating motion of the lever arm into unidirectional motion in the sprocket (19). This sprocket (19) is secured to one of the drive gears (21) and connects to an internal shifting hub mechanism (16) with a chain or belt (17).

The internal shifting hub (16) is designed to handle various gear ratios, and may be automatic or manual in nature. The automatic internal shifting hub option uses a shifting motor (26), central processing unit (35), and sensory feedback (34) from the rear wheel to dynamically determine optimal gear ratios for terrain and speed. The manual internal shifting hub option (not shown) would use conventional bicycle shifting levers to actuate the internal shifting hub cable (26). The internal shifting hub (16) has a second drive sprocket (33) attached to it with a chain or belt (18) transmitting the power to the rear sprocket (30) which is attached to the rear axle (15). This rear axle (15) is attached to, and drives the rear wheel (2) of the wheelchair. A disconnecting clutch (31) allows the user to disconnect the entire propulsion system from the chair, and operate the wheelchair in a conventional manner (by hand on the rear wheel handrails (13)). A compression spring (32) causes the propulsion system disconnecting clutch (31) to engage when not disconnected by means of the disengaging button (11).

A disk or roller brake (28) is attached to the internal shifting hub (16) and is actuated by a cable (25) that connects to the hand operated brake lever (12). A secondary brake option (not shown) using conventional bicycle caliper brakes directly at the wheelchair rims may also be used.

Figure 4:
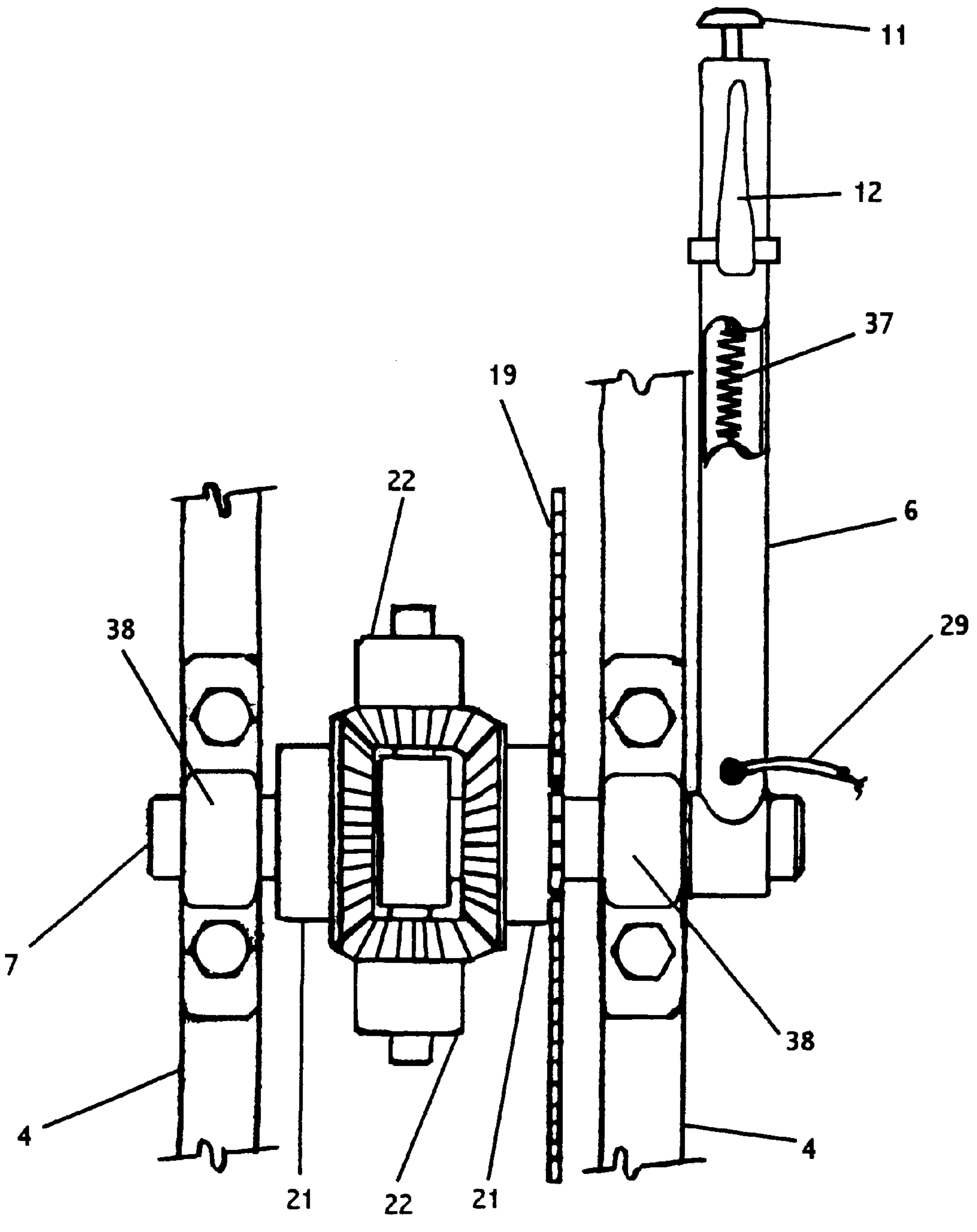
FIG. 4 is an enlarged view of the drive and idler gears along with the lever arm and disconnecting clutch cable with tension spring.
Figure 5:
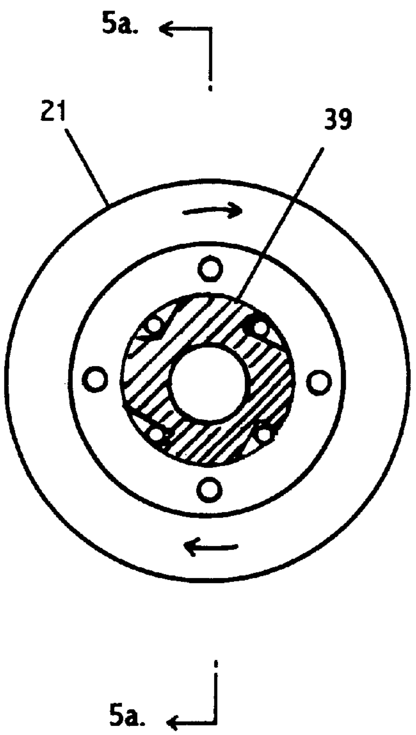
FIG. 5 is an enlarged view of a single drive gear with a press fit, one way clutch or ratcheting mechanism
Figure 5A:
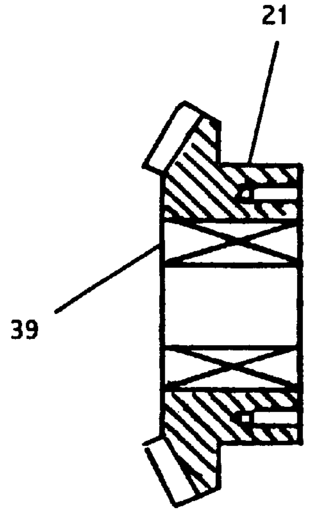
FIG. 5*a* is a cross sectional view of the single gear shown in FIG. 5.

Referring to FIG. 4, FIG. 5, FIG. 5*a* and FIG. 5, there is illustrated an enlarged view of one of the drive gear clusters. The two gears (21) include ratcheting mechanisms or one-way clutches (39) that allow the reciprocating motion of the lever arm (6) to transmit unidirectional rotation through the idler gears (22) to the main driving sprocket (19). It may be observed in FIG. 4, that the gears 22 comprise right-angled gears, and in this specific embodiment, beveled gears.

Internal to the lever arm (6), a tension spring (37) is shown. This spring (37) attaches to the disconnecting button (11) and disconnecting cable (29) to aid the user in disengaging the propulsion system of the chair when under load.

Figure 6:
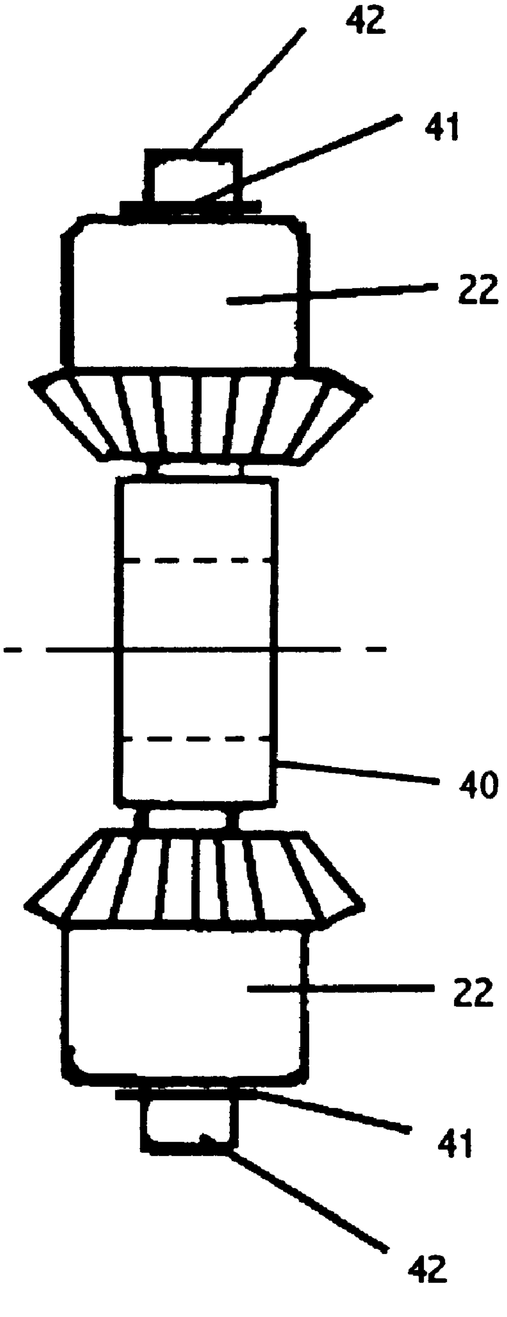
FIG. 6 is an enlarged view of the planetary idler gear assembly.
Figure 7:
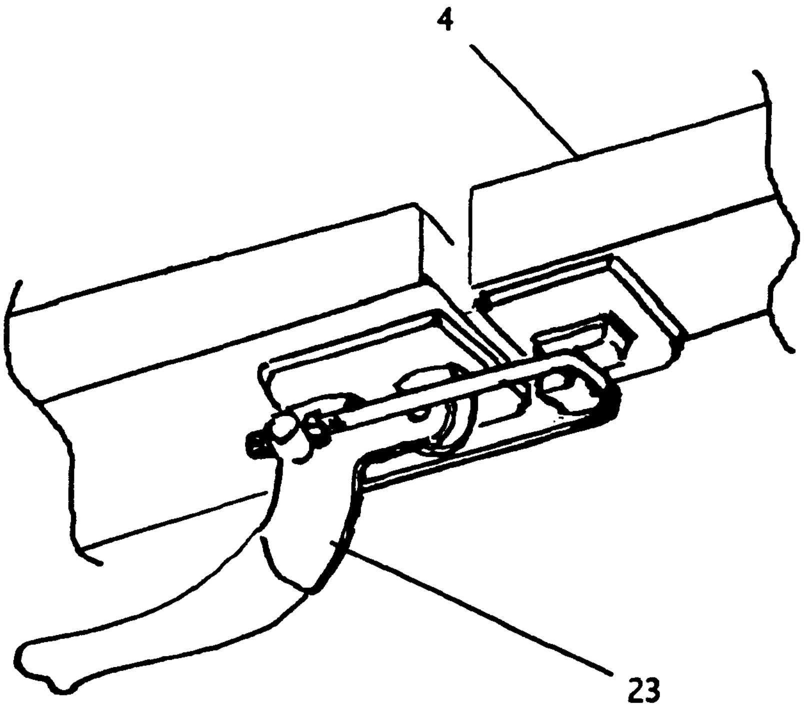
FIG. 7 is an enlarged view of the quick release draw clamps used to separate the chair.

Referring to FIG. 6, there is illustrated an enlarged view of the quick release draw clamp (23). This draw clamp is located near the centerline of the wheelchair (1), and allows the chair to be separated for ease in transportation.

What we claim as our invention and desire to be secured by Letters of Patent is:

1. A powered wheelchair system comprising, at least one driven wheel;

a propulsion system, wherein said propulsion system employs at least one lever arm operative in both a forward and a reverse stoke to produce unidirectional forward motion to said at least one driven wheel; and at least one internal shifting hub to change a gear ratio for accommodating various terrains and speeds, further comprising a disconnecting clutch for enabling disconnection of said propulsion system from said at least one driven wheel, thereby enabling operation of said wheelchair system in a conventional manner.

2. The powered wheelchair system according to claim 1, wherein said at least one internal shifting hub comprises a manually shifting hub.

3. The powered wheelchair system according to claim 1, wherein said at least one internal shifting hub comprises an automatically shifting hub.

4. The powered wheelchair system according to claim 1, wherein said disconnecting clutch is operated by actuation of a control member positioned near a position on said at least one lever arm where a user grasps said arm, wherein said disconnecting clutch and control member operatively interact via an extension spring, a cable and a compression spring.

5. The powered wheelchair system according to claim 1, further comprising a disk brake cooperating with said hub, for stopping motion of said wheelchair system.

6. The powered wheelchair system according to claim 1, wherein said propulsion system includes at least a one-way clutch mechanism to enable the reciprocating motion of said at least one lever arm to transmit unidirectional rotation to the at least one driven wheel.

7. A powered wheelchair system comprising, at least one driven wheel;

a propulsion system, wherein said propulsion system employs at least one lever arm operative in both a forward and a reverse stoke to produce unidirectional forward motion to said at least one driven wheel; and at least one internal shifting hub to change a gear ratio for accommodating various terrains and speeds, wherein said at least one internal shifting hub comprises an automatically shifting hub, wherein said automatically shifting hub includes:

a sensory feedback monitor;

a microprocessor for receiving input from said sensory feedback monitor and for directing shifting of said automatically shifting hub based thereon.

8. A powered wheelchair system comprising, at least one driven wheel;

a propulsion system, wherein said propulsion system employs at least one lever arm operative in both a forward and a reverse stoke to produce unidirectional forward motion to said at least one driven wheel; and at least one internal shifting hub to change a gear ratio for accommodating various terrains and speeds, wherein said propulsion system provides said unidirectional forward motion by cooperation of idler gears operatively connected with said at least one lever arm.

9. The powered wheelchair system according to claim 8, wherein said idler gears comprise right-angled gears.

10. The powered wheelchair system according to claim 8, wherein said idler gears comprise beveled gears.

11. A powered wheelchair system comprising, at least one driven wheel;

a propulsion system, wherein said propulsion system employs at least one lever arm operative in both a forward and a reverse stoke to produce unidirectional forward motion to said at least one driven wheel; and at least one internal automatically shifting hub shifting hub to change a gear ratio for accommodating various terrains and speeds, said automatically shifting hub including:

a sensory feedback monitor;

a microprocessor for receiving input from said sensory feedback monitor and for directing shifting of said automatically shifting hub based thereon.

12. The powered wheelchair system according to claim 11, further comprising a disconnecting clutch for enabling disconnection of said propulsion system from said at least one driven wheel, thereby enabling operation of said wheelchair system in a conventional manner.

13. The powered wheelchair system according to claim 12 wherein said disconnecting clutch is operated by actuation of a control member positioned near a position on said at least one lever arm where a user grasps said arm.

14. The powered wheelchair system according to claim 11, further comprising a disk brake cooperating with said hub, for stopping motion of said wheelchair system.

15. The powered wheelchair system according to claim 11, wherein said propulsion system provides said unidirectional forward motion by cooperation of idler gears operatively connected with said at least one lever arm.

16. The powered wheelchair system according to claim 15, wherein said idler gears comprise right-angled gears.

17. The powered wheelchair system according to claim 15, wherein said idler gears comprise beveled gears.

18. A powered wheelchair system comprising, at least one driven wheel;

a propulsion system, wherein said propulsion system employs at least one lever arm operative in both a forward and a reverse stoke to produce unidirectional forward motion to said at least one driven wheel; and at least one internal automatically shifting hub shifting hub to change a gear ratio for accommodating various terrains and speeds, said automatically shifting hub including:

a sensory feedback monitor; and a microprocessor for receiving input from said sensory feedback monitor and for directing shifting of said automatically shifting hub based thereon, a disconnecting clutch for enabling disconnection of said propulsion system from said at least one driven wheel, thereby enabling operation of said wheelchair system in a conventional manner, wherein said disconnecting clutch is operated by actuation of a control member positioned near a position on said at least one lever arm where a user grasps said arm, and a disk brake cooperating with said hub, for stopping motion of said wheelchair system.

19. The powered wheelchair system according to claim 18, wherein said propulsion system provides said unidirectional forward motion by cooperation of idler gears operatively connected with said at least one lever arm.

20. The powered wheelchair system according to claim 19, wherein said idler gears comprise right-angled gears.

21. The powered wheelchair system according to claim 19, wherein said idler gears comprise beveled gears.

* * * * *